US012539253B2

(12) United States Patent
Sanna Pinto

(10) Patent No.: US 12,539,253 B2
(45) Date of Patent: Feb. 3, 2026

(54) SELF-LUBRICATING MASSAGER

(71) Applicant: SHENZHEN MG TECHNOLOGY CO., LTD, Shenzhen (CN)

(72) Inventor: Victor Shelton Sanna Pinto, São Paulo (BR)

(73) Assignee: SHENZHEN MG TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 19/097,277

(22) Filed: Apr. 1, 2025

(65) Prior Publication Data

US 2025/0228735 A1 Jul. 17, 2025

(30) Foreign Application Priority Data

Oct. 28, 2024 (CN) ........................ 202422599718.9

(51) Int. Cl.
*A61H 19/00* (2006.01)
*A61H 23/02* (2006.01)

(52) U.S. Cl.
CPC ......... *A61H 19/44* (2013.01); *A61H 23/0254* (2013.01); *A61H 2201/0153* (2013.01); *A61H 2201/105* (2013.01); *A61H 2201/1238* (2013.01); *A61H 2201/169* (2013.01); *A61H 2201/5051* (2013.01); *A61H 2205/087* (2013.01)

(58) Field of Classification Search
None
See application file for complete search history.

(56) References Cited

U.S. PATENT DOCUMENTS

| | | | | |
|---|---|---|---|---|
| 2003/0171647 | A1 * | 9/2003 | Garland | A61H 19/32 600/38 |
| 2004/0034315 | A1 * | 2/2004 | Chen | A61H 19/44 601/72 |
| 2009/0275796 | A1 * | 11/2009 | Gil | A61H 19/44 600/38 |
| 2010/0331744 | A1 | 12/2010 | Eitzen | |
| 2014/0148740 | A1 * | 5/2014 | Howsam | A61H 23/00 206/524.1 |
| 2017/0189263 | A1 * | 7/2017 | Cambridge | A61H 19/40 |
| 2023/0320924 | A1 | 10/2023 | Zhou | |
| 2024/0245573 | A1 * | 7/2024 | Bartholomew | A61M 31/002 |
| 2024/0382372 | A1 | 11/2024 | Zhou | |

FOREIGN PATENT DOCUMENTS

| | | | | |
|---|---|---|---|---|
| CN | 113041119 A * | 6/2021 | | |
| WO | WO-2023131950 A1 * | 7/2023 | | A61H 19/34 |

* cited by examiner

*Primary Examiner* — Thaddeus B Cox
(74) *Attorney, Agent, or Firm* — Zhigang Ma

(57) ABSTRACT

The invention discloses a self-lubricating massager. The self-lubricating massager comprises a massager body, and two ends of the massager body are designated as a massage section and a handheld section respectively; a vibrating motor is installed inside the massage section, an end face of the massager body is provided with a liquid outlet, and a mounting frame is arranged inside the handheld section; one end of the mounting frame is provided with a operational chamber, a pressing head is installed in the operational chamber, a side of the pressing head is provided with a limiting edge, and a spring is arranged between the limiting edge and the operational chamber.

7 Claims, 4 Drawing Sheets

SELF-LUBRICATING MASSAGER

BACKGROUND OF THE INVENTION

Technical Field

The invention relates to the technical field of adult products, in particular to a self-lubricating massager.

Description of Related Art

Adult products, also known as sexual aids, include various types such as BDSM accessories, erotic lingerie, love eggs, dildos, vibrators, delay stimulators, and penis training devices, depending on their intended use. These products assist adults in enhancing their sexual experiences, not only adding excitement but also improving sexual health. For adult women, dildos, often referred to as massagers, are among the most commonly used items.

Currently, most massagers are designed in a long, cylindrical shape, modeled after the male penis, and typically include a built-in vibration mechanism, such as a vibrating motor and corresponding circuitry. However, these massagers generally only provide standard vibrating massage functionality, and it is necessary to apply a lubricant to prevent friction injuries during use. Generally, lubricants are applied before starting, and if there is a need to add more during use, it can be quite inconvenient, thus affecting the overall product experience.

Therefore, it is necessary to optimize and improve the prior art.

BRIEF SUMMARY OF THE INVENTION

In view of the shortcomings in the prior art, the invention provides a self-lubricating massager.

To achieve the above objective, the invention adopts the following technical scheme.

A self-lubricating massager comprises a massager body which is provided with a circuit board and a battery inside, wherein a button is exposed on an exterior of the massager body are arranged on the circuit board, and two ends of the massager body are designated as a massage section and a handheld section respectively; a vibrating motor is installed inside the massage section, and the vibrating motor and the battery are both connected to the circuit board; an end face of the massager body is provided with a liquid outlet, and a mounting frame is arranged inside the handheld section; one end of the mounting frame is provided with a operational chamber, a pressing head is installed in the operational chamber, a side of the pressing head is provided with a limiting edge which prevents the pressing head from detaching from the operational chamber, and a spring is arranged between the limiting edge and the operational chamber; the handheld section is provided with at least one air intake hole connected to the operational chamber; under an acting force of the spring, a top of the pressing head remains outside the handheld section, and the limiting edge just presses against the air intake hole; the other end of the mounting frame is provided with a liquid storage chamber connected to the operational chamber, and a one-way valve is arranged at a point where the liquid storage chamber is connected to the operational chamber; and the liquid storage chamber is sealed with a lid, and the liquid outlet is connected to the liquid storage chamber via a water pipe.

Preferably, a first duckbill valve which only allows liquid to be expelled outward is arranged at the liquid outlet.

Preferably, the massager body is covered with a soft rubber sleeve which has openings for the liquid outlet, the air intake hole, and the lid.

Preferably, the pressing head is provided with a hollow duct, and a lower sidewall of the pressing head is provided with a soft rubber ring which divides the operational chamber into an upper chamber and a lower chamber; and the one-way valve is a second duckbill valve which allows air to flow only into the lower chamber and is located within the hollow duct, an isolation chamber is formed between an upper end of the pressing head and the soft rubber sleeve, and the isolation chamber is connected to the air intake hole when the pressing head is pressed down.

Preferably, a capsule filled with a lubricant is arranged inside the liquid storage chamber, an inner end of the lid is provided with a piercing needle, and when the lid is latched or threaded onto an opening of the liquid storage chamber, the piercing needle presses against the capsule and punctures the same.

Preferably, an inner wall of the liquid storage chamber is provided with a guiding slope at the outlet.

Preferably, the soft rubber sleeve is provided with a handle at the handheld section for users to hold.

According to the above technical scheme of the invention, the massage section and the vibrating motor arranged in the massage section are used to meet the needs for conventional sexual massage. Additionally, the invention incorporates the built-in liquid storage chamber to hold the lubricant, which can be dispensed from the massage section by pressing as needed. This allows for timely replenishment of the lubricant, greatly enhancing the user experience, and the operation is very easy.

DETAILED DESCRIPTION OF THE INVENTION

Figure 1:
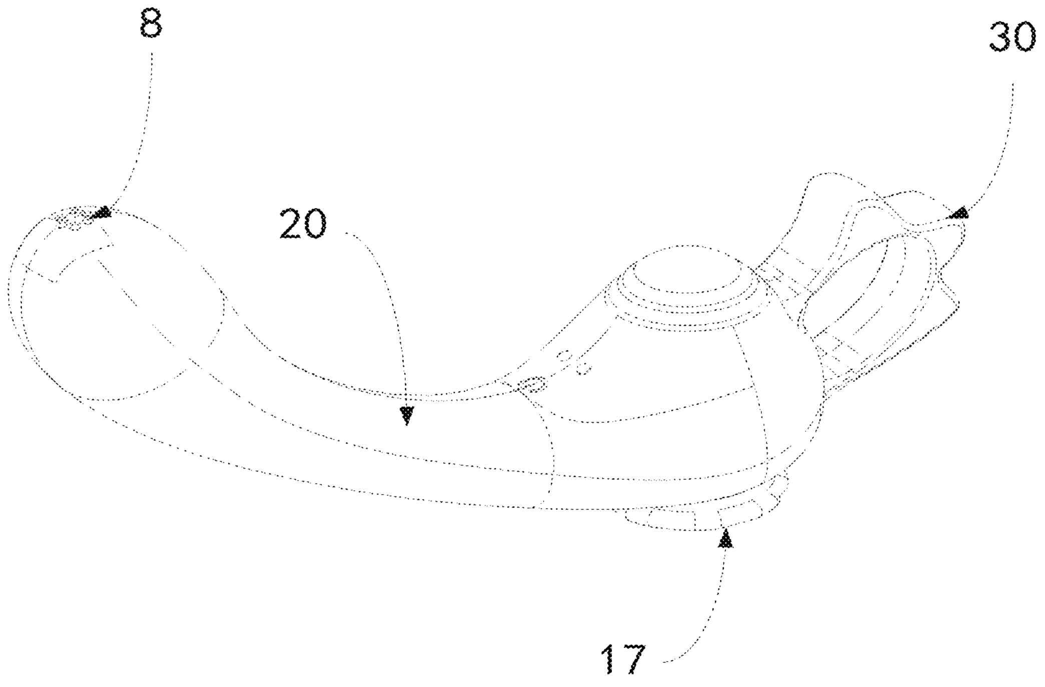
FIG. 1 is a perspective view of an embodiment of the invention.

In order to make the object, technical solutions and advantages of the present invention clearer, the following detailed description of the present invention is given in conjunction with attached drawings and embodiments. It should be understood that the specific embodiments described here are only for explaining the present invention, and do not limit the present invention.

In the description of the present invention, it should be understood that directional or positional relationships indicated by the terms such as “center”, “longitudinal”, “transverse”, “length”, “width”, “thickness”, “upper”, “lower”, “front”, “rear”, “left”, “right”, “vertical”, “horizontal”, “top”, “bottom”, “inner”, “outer”, “clockwise” and “anticlockwise” are based on the directional or positional relationships shown in the drawings, which are only for the convenience of describing the invention and simplifying the description, but do not indicate or imply that the referred devices or elements must have a specific orientation or be constructed and operated in a specific orientation, so they cannot be understood as limiting the invention. In addition, the terms "first" and "second" are only used for the descriptive purpose, and cannot be understood as indicating or implying relative importance or implicitly indicating the number of indicated technical features. Therefore, the features defined with "first" and "second" may explicitly or implicitly include one or more of the features. In the description of the invention, "a plurality of" means two or more, unless otherwise specifically defined.

In the description of the invention, it should be noted that the terms "install" and "connect" should be understood in a broad sense unless otherwise specified and defined. For example, it may be fixed connection, detachable connection or integrated connection; it may be mechanical connection or electric connection; and it may be direct connection, indirect connection through intermediate media, internal communication of two elements or interaction between two elements. For those of ordinary skill in the art, the specific meanings of the above terms in the invention may be understood according to specific situations.

Figure 2:
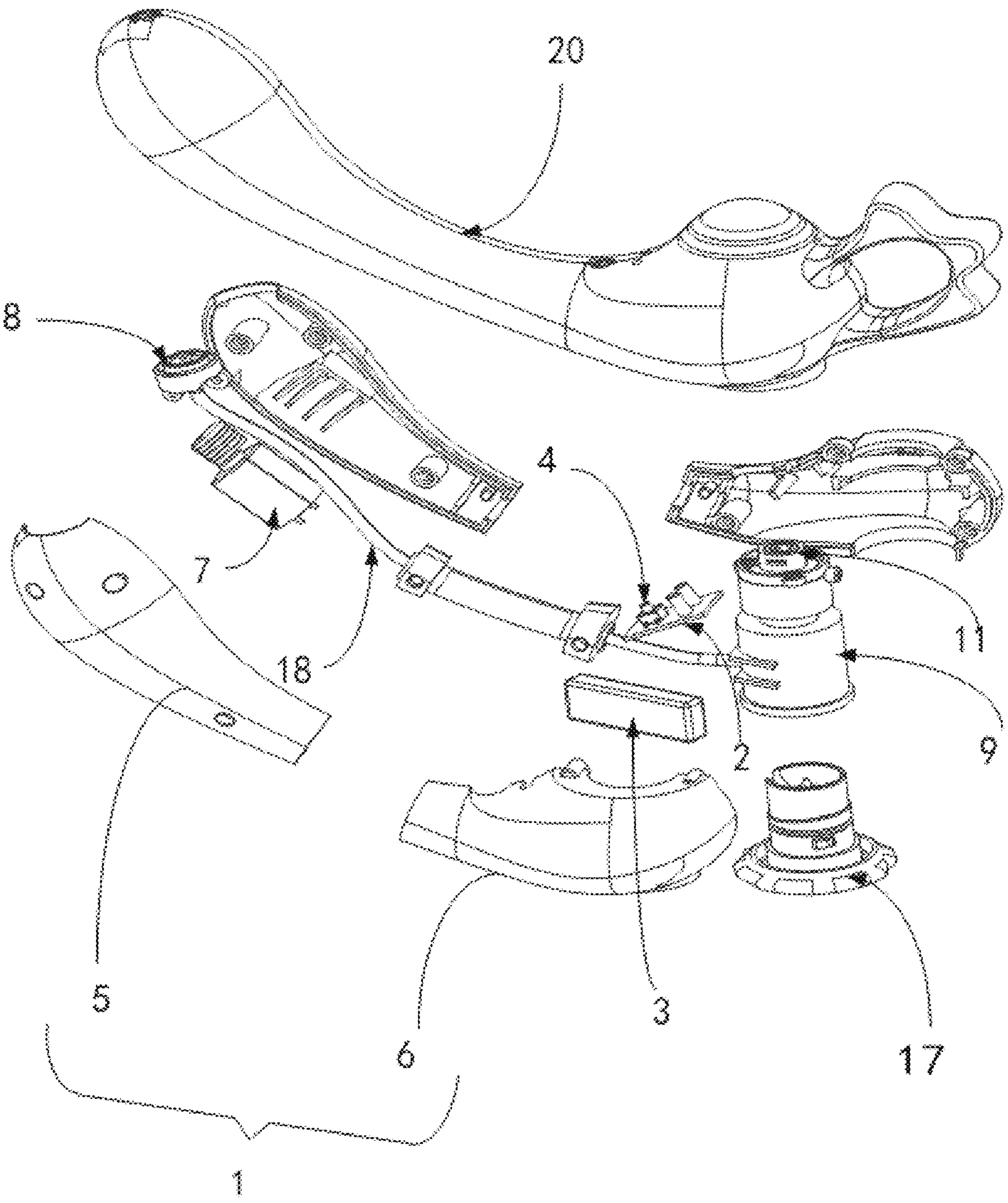
FIG. 2 is an explosive view of an embodiment of the invention.
Figure 3:
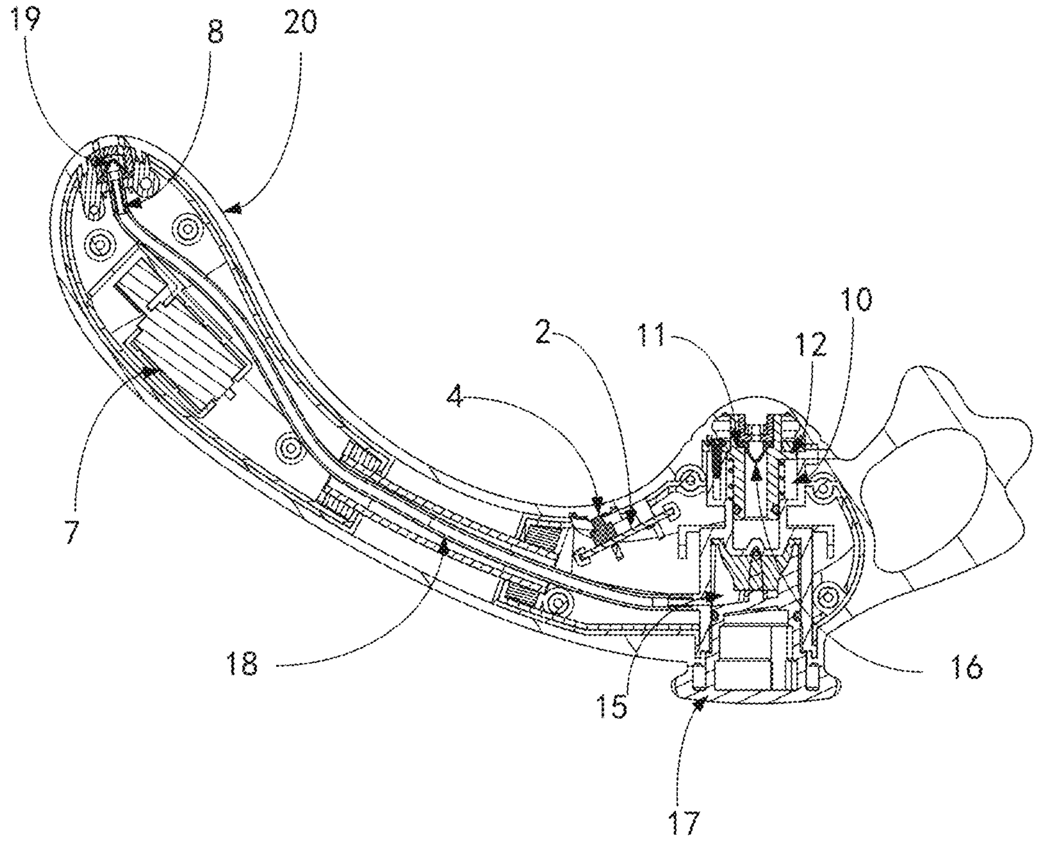
FIG. 3 is a sectional view of an embodiment of the invention.
Figure 4:
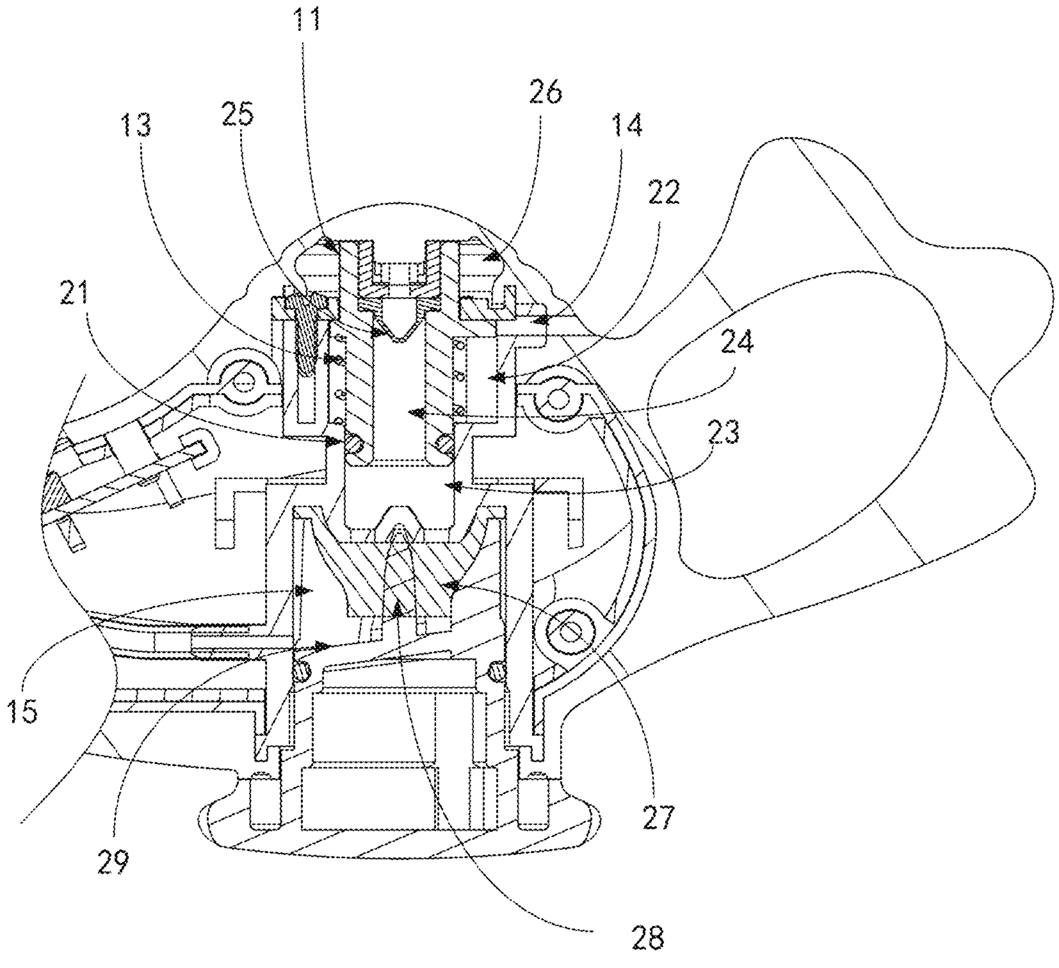
FIG. 4 is a sectional view of a handheld section in an embodiment of the invention.

As shown in FIGS. 1-4, a self-lubricating massager provided by this embodiment comprises a massager body 1 which is provided with a circuit board 2 and a battery 3 inside, wherein a button 4 is exposed on an exterior of the massager body 1 are arranged on the circuit board 2, and two ends of the massager body 1 are designated as a massage section 5 and a handheld section 6 respectively; a vibrating motor 7 is installed inside the massage section 5, and the vibrating motor 7 and the battery 3 are both connected to the circuit board 2; an end face of the massager body 1 is provided with a liquid outlet 8, and a mounting frame 9 is arranged inside the handheld section 6; one end of the mounting frame 9 is provided with a operational chamber 10, a pressing head 11 is installed in the operational chamber 10, a side of the pressing head 11 is provided with a limiting edge 12 which prevents the pressing head 11 from detaching from the operational chamber 10, and a spring 13 is arranged between the limiting edge 12 and the operational chamber 10; the handheld section 6 is provided with at least one air intake hole 14 connected to the operational chamber 10; under an acting force of the spring 13, a top of the pressing head 11 remains outside the handheld section 6, and the limiting edge 12 just presses against the air intake hole 14; the other end of the mounting frame 9 is provided with a liquid storage chamber 15 connected to the operational chamber 10, and a one-way valve 16 is arranged at a point where the liquid storage chamber 15 is connected to the operational chamber 10; and the liquid storage chamber 15 is sealed with a lid 17, and the liquid outlet 8 is connected to the liquid storage chamber 15 via a water pipe 18.

According to the embodiment, the massage section 5 and the vibrating motor 7 arranged in the massage section 5 are used to meet the needs for conventional sexual massage. Additionally, the invention incorporates the built-in liquid storage chamber 15 to hold the lubricant, which can be dispensed from the massage section 5 by pressing as needed. This allows for timely replenishment of the lubricant, greatly enhancing the user experience, and the operation is very easy.

During use, the liquid storage chamber 15 needs to be filled with a lubricant and then covered with the lid 17. Subsequently, the vibrating motor 7 may be activated by pressing the button 4. Users may place the massage section 5 on the area that requires massage. When the lubricant needs to be dispensed, they simply press the pressing head 11 located on the handheld section 6. By doing so, and with the arrangement of the one-way valve 16 and the air intake hole 14, the lubricant from the liquid storage chamber 15 can gradually flow through the water pipe 18 to the liquid outlet 8 and be expelled from there, allowing for lubricant replenishment at any time during the massage process.

Further, to prevent liquid backflow at the liquid outlet 8, thus preventing external liquid from entering the water pipe 18, a first duckbill valve 19 which only allows liquid to be expelled outward is arranged at the liquid outlet 8.

Further, to enhance the comfort of the massage, the massager body 1 in this embodiment is covered with a soft rubber sleeve 20 which has openings for the liquid outlet 8, the air intake hole 14, and the lid 17. The soft rubber sleeve 20 not only improves the comfort of the massage but also provides an integrated waterproof function. To charge the internal battery, magnetic charging pins or wireless charging can be used.

Further, regarding the specific structure and operational principle of the one-way valve 16, in this embodiment, the pressing head 11 is provided with a hollow duct 24, and a lower sidewall of the pressing head 11 is provided with a soft rubber ring 21 which divides the operational chamber 10 into an upper chamber 22 and a lower chamber 23; and the one-way valve 16 is a second duckbill valve 25 which allows air to flow only into the lower chamber 22 and is located within the hollow duct 24, an isolation chamber 26 is formed between an upper end of the pressing head 11 and the soft rubber sleeve 20, and the isolation chamber 26 is connected to the air intake hole 14 by means of the upper chamber 22 when the pressing head 11 is pressed down. To dispense the lubricant, the user simply needs to press the area of the soft rubber sleeve 20 located at the top of the pressing head 11, causing the pressing head 11 to move downward into the lower chamber 23 of the operational chamber 10. During this downward movement, an inner wall of the soft rubber sleeve 20 continuously presses against an upper port of the pressing head 11, temporarily sealing it. This, in conjunction with the soft rubber ring 21, allows the air in the lower chamber 23 of the operational chamber 10 to be transferred into the liquid storage chamber 15, compressing the lubricant in the liquid storage chamber 15 and forcing it gradually into the water pipe 18 until it is expelled. After releasing the pressing head 11, the presence of the second duckbill valve 25 prevents the air entering the liquid storage chamber 15 from flowing back. Once the pressing head 11 is released, since the limiting edge 12 of the pressing head 11 and the air intake hole 14 are staggered after the pressing head 11 is pressed down, a communication pathway is created between the isolation chamber 26 at the soft rubber sleeve 20 and the air intake hole 14. As a result, the soft rubber sleeve 20 will automatically return to its original shape, releasing the temporary sealing effect on the pressing head 11. Consequently, the pressing head 11 will also revert under the action of the spring 13, preparing for the next pressing action, thus completing a cycle of liquid dispensing.

Further, to facilitate the addition of the lubricant, the lubricant is provided in a capsule form. Specifically, in this embodiment, a capsule 27 filled with a lubricant is arranged inside the liquid storage chamber 15, an inner end of the lid 17 is provided with a piercing needle 28, and when the lid 17 is latched or threaded onto an opening of the liquid storage chamber 15, the piercing needle 28 presses against the capsule 27 and punctures the same. After the lid 17 is closed, the lubricant will flow out, preventing messiness when manually adding the lubricant and allowing for easy control of the lubricant dosage.

Further, to facilitate better flow of the lubricant in the liquid storage chamber 15 to the outlet after the capsule 27 is punctured, in this embodiment, an inner wall of the liquid storage chamber 15 is provided with a guiding slope 29 at the outlet.

Further, to make it easier for users to hold during massage, in this embodiment, the soft rubber sleeve 20 is provided with a handle 30 at the handheld section 6 for users to hold.

The above are only preferred embodiments of the present invention, which do not limit the patent scope of the present invention. Any equivalent structure or equivalent flow transformation made by using the contents of the specification and drawings of the present invention, or directly or indirectly applied to other related technical fields, are equally included in the patent protection scope of the present invention.

What is claimed is:

1. A self-lubricating massager, comprising a massager body which is provided with a circuit board and a battery inside, wherein two ends of the massager body are designated as a massage section and a handheld section respectively; a vibrating motor is installed inside the massage section, and the vibrating motor and the battery are both connected to the circuit board; an end face of the massager body is provided with a liquid outlet, and a mounting frame is arranged inside the handheld section; one end of the mounting frame is provided with a operational chamber, a pressing head is installed in the operational chamber, a side of the pressing head is provided with a limiting edge which prevents the pressing head from detaching from the operational chamber, and a spring is arranged between the limiting edge and the operational chamber; the handheld section is provided with at least one air intake hole connected to the operational chamber; under an acting force of the spring, a top of the pressing head remains outside the handheld section, and the limiting edge presses against at least one air intake hole; an other end of the mounting frame is provided with a liquid storage chamber connected to the operational chamber, and a one-way valve is arranged at a point where the liquid storage chamber is connected to the operational chamber; and the liquid storage chamber is sealed with a lid, and the liquid outlet is connected to the liquid storage chamber via a water pipe.

2. The self-lubricating massager according to claim 1, wherein a first duckbill valve which only allows liquid to be expelled outward is arranged at the liquid outlet.

3. The self-lubricating massager according to claim 2, wherein the massager body is covered with a soft rubber sleeve which has openings for the liquid outlet, the at least one air intake hole, and the lid.

4. The self-lubricating massager according to claim 3, wherein the pressing head is provided with a hollow duct, and a lower sidewall of the pressing head is provided with a soft rubber ring which divides the operational chamber into an upper chamber and a lower chamber; and the one-way valve is a second duckbill valve which allows air to flow only into the lower chamber and is located within the hollow duct, an isolation chamber is formed between an upper end of the pressing head and the soft rubber sleeve, and the isolation chamber is connected to the at least one air intake hole when the pressing head is pressed down.

5. The self-lubricating massager according to claim 4, wherein a capsule filled with a lubricant is arranged inside the liquid storage chamber, an inner end of the lid is provided with a piercing needle, and when the lid is latched or threaded onto an opening of the liquid storage chamber, the piercing needle presses against the capsule and punctures the same.

6. The self-lubricating massager according to claim 5, wherein an inner wall of the liquid storage chamber is provided with a guiding slope at an outlet.

7. The self-lubricating massager according to claim 6, wherein the soft rubber sleeve is provided with a handle at the handheld section for users to hold.

* * * * *